(12) United States Patent
Park et al.

(10) Patent No.: US 12,206,117 B2
(45) Date of Patent: Jan. 21, 2025

(54) METHOD FOR MANUFACTURING CORE-SHELL CATALYST USING CARBON MONOXIDE

(71) Applicant: KOREA INSTITUTE OF ENERGY RESEARCH, Daejeon (KR)

(72) Inventors: Gu-gon Park, Daejeon (KR); Eun Jik Lee, Uiwang-si (KR); Kyunghee Kim, Mokpo-si (KR); Sung-dae Yim, Daejeon (KR); Seok-hee Park, Daejeon (KR); Min-ji Kim, Daejeon (KR); Young-jun Sohn, Daejeon (KR); Byungchan Bae, Daejeon (KR); Seung-gon Kim, Daejeon (KR); Dongwon Shin, Sejong-si (KR); Hwanyeong Oh, Daejeon (KR); Seung Hee Woo, Daejeon (KR); So Jeong Lee, Daejeon (KR); Hyejin Lee, Daejeon (KR); Yoon Young Choi, Sejong-si (KR); Won-yong Lee, Daejeon (KR); Tae-hyun Yang, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 18/465,471

(22) Filed: Sep. 12, 2023

(65) Prior Publication Data
US 2023/0420696 A1 Dec. 28, 2023

Related U.S. Application Data

(62) Division of application No. 17/466,453, filed on Sep. 3, 2021, now Pat. No. 11,791,475.

(30) Foreign Application Priority Data

Sep. 7, 2020 (KR) ........................ 10-2020-0113736

(51) Int. Cl.
  *H01M 4/92* (2006.01)
  *B01J 23/28* (2006.01)
  (Continued)

(52) U.S. Cl.
  CPC ............. *H01M 4/926* (2013.01); *B01J 23/28* (2013.01); *B01J 23/30* (2013.01); *B01J 23/34* (2013.01);
  (Continued)

(58) Field of Classification Search
  CPC . B01J 35/397; B01J 23/28; B01J 23/30; B01J 23/34; B01J 23/38; B01J 37/00
  (Continued)

(56) References Cited

U.S. PATENT DOCUMENTS 7,507,495 B2    3/2009  Wang et al.
11,791,475 B2 * 10/2023 Park ........................ B22F 1/17
                                               429/523
(Continued)

FOREIGN PATENT DOCUMENTS

EP    3629409 A1   4/2020
JP    5443029 B2   3/2014
(Continued)

*Primary Examiner* — Patricia L. Hailey
(74) *Attorney, Agent, or Firm* — Rabin & Berdo, P.C.

(57) ABSTRACT

The present disclosure relates to a method for manufacturing core-shell particles using carbon monoxide, and more particularly, to a method for manufacturing core-shell particles, the method of which a simple and fast one-pot reaction enables particle manufacturing to reduce process costs, facilitate scale-up, change various types of core and shell metals, and form a multi-layered shell by including the steps of adsorbing carbon monoxide on a transition metal for a (Continued)

core, and reacting carbon monoxide adsorbed on the surface of the transition metal for the core, a metal precursor for a shell, and a solvent to form particles with a core-shell structure having a reduced metal shell layer formed on a transition metal core.

5 Claims, 9 Drawing Sheets

(51) Int. Cl.
  *B01J 23/30* (2006.01)
  *B01J 23/34* (2006.01)
  *B01J 23/38* (2006.01)
  *B01J 35/30* (2024.01)
  *B01J 37/00* (2006.01)
  *H01M 4/86* (2006.01)

(52) U.S. Cl.
  CPC ............ *B01J 23/38* (2013.01); *B01J 35/397* (2024.01); *B01J 37/00* (2013.01); *H01M 4/8657* (2013.01)

(58) Field of Classification Search
  USPC ........................................ 502/182, 184, 185
  See application file for complete search history.

(56) References Cited

U.S. PATENT DOCUMENTS

| | | |
|---|---|---|
| 2003/0039860 A1 | 2/2003 | Cheon et al. |
| 2015/0333336 A1 | 11/2015 | Cho et al. |
| 2016/0036065 A1 | 2/2016 | Hwang et al. |
| 2020/0129973 A1 | 4/2020 | Wang |

FOREIGN PATENT DOCUMENTS

| | | |
|---|---|---|
| JP | 5650093 B2 | 1/2015 |
| JP | 2015213036 A | 11/2015 |
| JP | 5829973 B2 | 12/2015 |
| JP | 2015223535 A | 12/2015 |
| JP | 5991430 B2 | 9/2016 |
| JP | 6168009 B2 | 7/2017 |
| KR | 1020040088288 A | 10/2004 |
| KR | 1020130026273 A | 3/2013 |
| KR | 1020140098513 A | 8/2014 |

\* cited by examiner

METHOD FOR MANUFACTURING CORE-SHELL CATALYST USING CARBON MONOXIDE

CROSS-REFERENCE TO RELATED APPLICATIONS

This application is a division of U.S. application Ser. No. 17/466,453 filed on Sep. 3, 2021, which claims the priority of Korean Patent Application No. 10-2020-0113736 filed on Sep. 7, 2020, in the Korean Intellectual Property Office, the disclosure of which is incorporated herein by reference.

BACKGROUND

Field

The present disclosure relates to a method for manufacturing particles with a core-shell structure by forming a shell layer on a core based on adsorption and oxidation actions of carbon monoxide.

Description of the Related Art

In general, a fuel cell which is in the spotlight as a next-generation energy source is a device directly converting chemical energy generated by oxidation/reduction of fuel into electrical energy and has recently been expected as a future electric power for transportation such as electric vehicles and for power supply at home. The electrode reaction in a fuel cell is composed of a hydrogen oxidation reaction at the anode and an oxygen reduction reaction at the cathode, and in order for these electrochemical reactions to actually occur smoothly in fuel cell systems driven at low temperatures such as polymer electrolyte membrane fuel cells, etc., the reaction rate should be effectively increased.

For the above-mentioned reasons, supported platinum and platinum alloy materials have been employed as an electrode catalyst of a cathode of a conventional fuel cell. However, the amount of platinum required in today's electrode catalysts is still expensive in commercially realizing mass production of fuel cells. Therefore, researches for reducing the amount of platinum contained in the fuel cell cathode and anode by combining platinum with a cheaper metal have been done.

Recently, core-shell type catalyst particles (hereinafter, referred to as a core-shell catalyst), as an electrode catalyst for a fuel cell, have been receiving attention. As a method for increasing the coverage of the shell to the core, a method has been known, the method that replaces the concerned monoatomic layer with a shell part after forming in advance a monoatomic layer on the surface of a core part by an underpotential deposition method such as a Cu-underpotential deposition method (hereinafter, referred to as a Cu-UPD method).

The Cu-UPD method, as a method of using a potential difference between metals, requires various and complex equipment for applying a voltage, and has cumbersomeness that the catalyst (Cu) metal for forming a potential difference should also be changed together when changing the type of a core metal. Therefore, the Cu-UPD method has disadvantages in that manufacturing time is long and mass production is difficult.

PRIOR ART DOCUMENTS

Patent Documents (Patent document 0001) Japanese Registered Patent No. 5,991,430
(Patent document 0002) Japanese Registered Patent No. 6,168,009
(Patent document 0003) Japanese Registered Patent No. 5,829,973

SUMMARY

Accordingly, in order to improve the foregoing problems in the present disclosure, an object of the present disclosure is to present a method for manufacturing core-shell particles, the method that is easy for mass production by enabling core-shell particles to be manufactured through a simple and fast reaction process.

Furthermore, another object of the present disclosure is to present a method for manufacturing core-shell particles, the method that not only can be simply applied without cumbersomeness even when using various metal types as a core or a shell, but also can adjust the thickness of the shell in various ways by forming the structure of the shell in multiple layers.

However, technical tasks to be achieved in the present disclosure are not limited to the technical tasks mentioned above, and other technical tasks that have not been mentioned can be clearly understood by those with ordinary skill in the art to which the present disclosure pertains from the description below.

In order to achieve the above-mentioned technical tasks, the present disclosure provides a method for manufacturing core-shell particles using carbon monoxide, the method including the steps of adsorbing carbon monoxide on a transition metal for a core, and reacting carbon monoxide adsorbed on the surface of the transition metal for the core, a metal precursor for a shell, and a solvent to form particles with a core-shell structure having a reduced metal shell layer formed on a transition metal core.

Furthermore, the present disclosure provides a method for manufacturing core-shell particles using carbon monoxide, the method including the steps of: sequentially performing a primary nitrogen purge, a carbon monoxide purge, and a secondary nitrogen purge in a transition metal solution for a core; and preparing a solution containing particles having a transition metal core and a single-layered metal shell formed thereon by adding the metal precursor for the shell to the solution in which the purges have been performed.

In an embodiment, the transition metal solution for the core may be a solution containing particles in which the transition metal for the core is adsorbed on the carbon support by preparing the transition metal solution for the core by including the steps of preparing a mixed solution by adding a transition metal precursor for a core to a carbon support-dispersed aqueous solution and adjusting pH of the mixed solution to a range of 10 to 12.

In an embodiment, the method may include the steps of sequentially performing a primary nitrogen purge, a carbon monoxide purge, and a secondary nitrogen purge in a solution containing particles having the transition metal core and the single-layered metal shell formed thereon, and preparing a solution containing particles having the transition metal core and a two-layered metal shell formed thereon by adding the metal precursor for the shell to the solution in which the purges have been performed.

In an embodiment, a solution containing particles having a transition metal for a core and a multi-layered metal shell formed thereon may be prepared by repeatedly performing a process consisting of the steps of sequentially performing a primary nitrogen purge, a carbon monoxide purge, and a secondary nitrogen purge in a solution containing particles having a transition metal core and a metal shell formed thereon, and adding a metal precursor for a shell to the solution in which the purges have been performed.

In an embodiment, the method may further include the step of filtering, washing, and drying the solution containing the particles having the transition metal core and the single-layered metal shell formed thereon.

In an embodiment, the carbon support may be a porous carbon support.

In an embodiment, the transition metal for the core may be one or more selected from the group consisting of palladium, iridium, ruthenium, gold, cobalt, nickel, iron, copper, manganese, molybdenum, rhenium, tungsten, and zinc.

In an embodiment, the metal precursor for the shell may be a precursor of one or more metals from the group consisting of platinum (Pt), gold (Au), palladium (Pd), iridium (Ir), ruthenium (Ru), osmium (Os), silver (Ag), and rhenium (Re).

The manufactured core-shell particles may have a size of 1 to 100 nm along the orthogonal direction.

A method for manufacturing core-shell particles using carbon monoxide according to the present disclosure has an advantage that particles with a core and shell structure can be manufactured in a one-pot process.

Further, a method for manufacturing core-shell particles using carbon monoxide according to the present disclosure has advantages that it not only is easy to scale-up, but also is economically excellent since the unit cost of a reaction raw material is low and manufacturing of particles is possible through a simple and fast reaction process to reduce process costs.

Further, a method for manufacturing core-shell particles using carbon monoxide according to the present disclosure has advantages that various metal types can be used as a core or a shell, and a shell with a multi-layered structure (thickness of the shell can be adjusted) can be formed by an easy method.

However, effects obtainable in the present disclosure are not limited to the effects mentioned above, and other effects that have not been mentioned can be clearly understood by those with ordinary skill in the art to which the present disclosure pertains from the description below.

DETAILED DESCRIPTION OF THE PREFERRED EMBODIMENT

Figure 1:
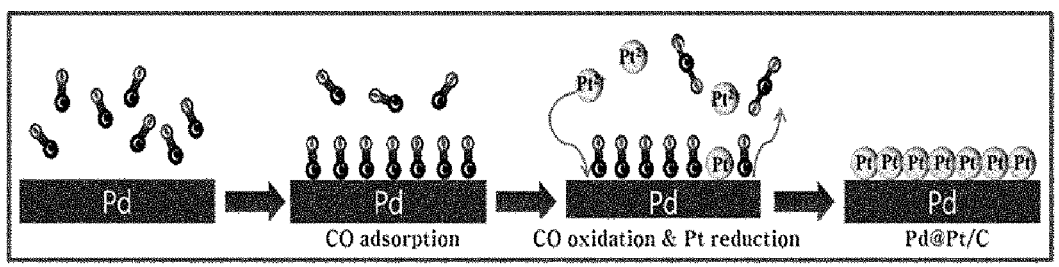
FIG. 1 is a schematic diagram of a process for manufacturing core-shell particles with a single shell layer structure according to the present disclosure.

Hereinafter, embodiments of the present disclosure will be described in detail with reference to the accompanying drawings so that those with ordinary skill in the art to which the present disclosure pertains will easily be able to implement the present disclosure. However, since descriptions of the present disclosure are merely embodiments for structural or functional descriptions, the scope of rights of the present disclosure should not be construed to be limited by the embodiments described in the text. That is, since the embodiments are capable of being variously changed and may have various forms, the scope of rights of the present disclosure should be understood to include equivalents capable of realizing the technical idea. Further, since the objects or effects presented in the present disclosure do not mean that a specific embodiment should include all of them or only such effects, it should not be understood that the scope of rights of the present disclosure is limited thereby.

The meaning of terms described in the present disclosure should be understood as follows.

Terms such as "first" and "second" are for distinguishing one constituent element from another, and the scope of rights should not be limited by these terms. For example, a first constituent element may be named a second constituent element, and similarly, a second constituent element may also be named a first constituent element. When a constituent element is referred to as being "connected to" the other constituent element, it may be directly connected to the other constituent element, but it should be understood that another constituent element may exist in the middle thereof. On the other hand, when a constituent element is referred to as being "directly connected" to the other constituent element, it should be understood that another constituent element does not exist in the middle thereof. Meanwhile, other expressions describing the relationship between the constituent elements, that is, "between" and "right in between" or "neighboring to" and "directly adjacent to", etc., should be interpreted similarly.

It should be understood that an expression of the singular number includes an expression of the plural number unless clearly defined otherwise in the context, and it should be understood that a term such as "comprise", "have", or the like is intended to specify existence of a feature, a number, a step, an operation, a constituent element, a part, or a combination thereof described in the specification, and it does not preclude the possibility of the existence or addition of one or more other features, numbers, steps, operations, constituent elements, parts, or combinations thereof.

Unless otherwise defined, all terms used herein have the same meaning as commonly understood by those with ordinary skill in the art to which the present disclosure pertains. Terms defined in commonly used dictionaries should be interpreted as having meanings that are consistent with those in the context of the related art, and cannot be interpreted as having ideal or excessively formal meanings unless clearly defined in the present disclosure.

The present disclosure relates to a method for manufacturing particles with a core-shell structure by performing adsorption induced deposition (AID) using carbon monoxide, and specifically, particles with a core-shell structure are manufactured through a process of forming a metal shell layer by inducing adsorption and oxidation actions of carbon monoxide on a transition metal core.

FIG. 1 shows a schematic diagram of a process for manufacturing core-shell particles with a single shell layer structure according to the present disclosure. FIG. 1 shows, as an example, a process for manufacturing particles with a palladium core and a platinum shell structure, and specifically, core-shell particles with a single shell layer structure are manufactured through a process of simultaneously performing oxidation of the adsorbed carbon monoxide and reduction of platinum after adsorbing carbon monoxide on a palladium metal core.

Figure 6:
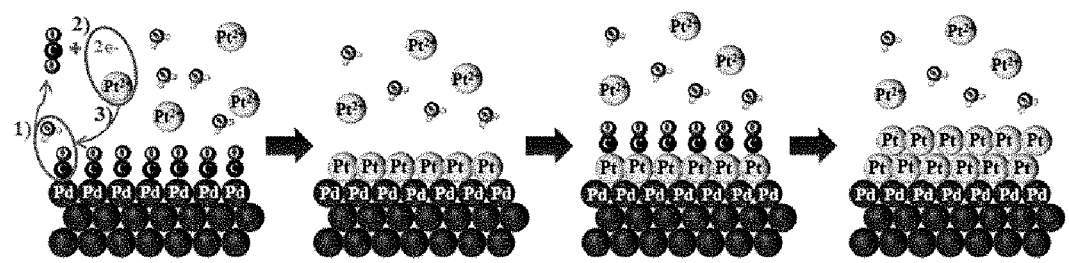
FIG. 6 is a schematic diagram of a process for manufacturing core-shell particles with a multi-shell layer structure according to the present disclosure.

Further, FIG. 6 shows a schematic diagram of a process for manufacturing core-shell particles with a multi-shell layer structure according to the present disclosure. FIG. 6 shows, as an example, a process for manufacturing particles having a palladium core and a platinum shell with a multi-layer structure, and specifically, core-shell particles with a single shell layer structure are manufactured by adsorbing carbon monoxide on the palladium metal core in the same manner as in FIG. 1, and simultaneously performing oxidation of the adsorbed carbon monoxide and reduction of platinum. Thereafter, core-shell particles with a two-layer shell structure are manufactured through a process of simultaneously performing oxidation of the adsorbed carbon monoxide and reduction of platinum after adsorbing carbon monoxide on the platinum shell layer. At this time, the number of shell layers may be adjusted by repeatedly performing the processes of adsorption of carbon monoxide, oxidation of the adsorbed carbon monoxide, and reduction of platinum as described above.

Hereinafter, a method for manufacturing particles with a core-shell structure using carbon monoxide according to the present disclosure includes the steps of adsorbing carbon monoxide on a transition metal for a core, and reacting carbon monoxide adsorbed on the surface of the transition metal for the core, a metal precursor for a shell, and a solvent to form particles with a core-shell structure having a reduced metal shell layer formed on a transition metal core. At this time, although the solvent is not particularly limited as long as it is a material capable of generating electrons of carbon monoxide, specifically, ultrapure water or $C_1$-$C_6$ alcohol may be used.

Specifically, the manufacturing method of the present disclosure includes the steps of: sequentially performing a primary nitrogen purge, a carbon monoxide purge, and a secondary nitrogen purge in a transition metal solution for a core; and preparing a solution containing particles having a transition metal core and a single-layered metal shell formed thereon by adding the metal precursor for the shell to the solution in which the purges have been performed.

Each step of manufacturing the particles with the core-shell structure will be examined specifically as follows.

First, a primary nitrogen purge, a carbon monoxide purge, and a secondary nitrogen purge are sequentially performed in the transition metal solution for the core.

Although the transition metal precursor is not particularly limited as it is generally used in the art, the transition metal for the core may be one or more selected from the group consisting of palladium, iridium, ruthenium, gold, cobalt, nickel, iron, copper, manganese, molybdenum, rhenium, tungsten, and zinc.

The primary nitrogen purge serves to remove oxygen, etc. which may exist in an existing solution, the carbon monoxide purge is a process for adsorbing carbon monoxide onto particles in which a transition metal is introduced on a carbon support, and the secondary nitrogen purge serves to control that an excessive platinum shell layer is formed as excessive carbon monoxide remained in the solution.

At this time, the primary nitrogen purge and the secondary nitrogen purge may be adjustable depending on the amount of core-shell particles manufactured, and specifically, it is preferable to use the primary purge so that the dissolved oxygen concentration becomes 10% or less compared to the initial one, and to use the secondary purge so that the dissolved carbon monoxide concentration becomes 20% or less compared to the initial one.

Further, the carbon monoxide purge may be used in proportion to the amount of a core metal. Carbon monoxide should be able to be adsorbed onto the entire outer surface area of the core metal, and it is preferable to adjust the amount of carbon monoxide so that carbon monoxide may be additionally supplied to the surface of the core exposed after the reduction reaction of the shell metal. Specifically, a supply amount and a supply time of carbon monoxide capable of dissolving carbon monoxide of 20 to 100% of the saturated solubility in a solution for performing the carbon monoxide purge are required.

At this time, a shell layer may not be sufficiently formed if carbon monoxide is less than the above-mentioned saturated solubility range, and an excessively thick shell layer may be formed if carbon monoxide exceeds the above-mentioned saturated solubility range.

Further, the present disclosure may use a solution containing particles having the transition metal for the core adsorbed on the carbon support as the transition metal solution for the core. The solution containing the particles having the transition metal for the core adsorbed on the carbon support may be prepared by a method generally used in the art. Specifically, the method may include the steps of preparing a mixed solution by adding a transition metal precursor for a core to a carbon support-dispersed aqueous solution, and adjusting pH of the mixed solution to a range of 10 to 12.

The carbon support is not particularly limited if it is generally used in the art as a support for a core-shell catalyst. For example, a porous carbon support may be used. When the porous carbon support is used, a larger amount of particles with a core-shell structure may be efficiently supported by a large surface area. The carbon support is used to increase the efficiency of particle generation, and is not necessarily used.

In addition, a metal oxide, etc. capable of supporting nanoparticles with a core/shell structure may be used.

As such a carbon support, one having a specific surface area of 20 to 2,000 m$^2$/g is used, and an aqueous solution having the carbon support dispersed therein is prepared by mixing the carbon support with ultrapure water. The dispersion, as one that is generally used in the art, is not particularly limited, and specifically, a batch type or horn type ultrasonic disperser may be used. At this time, the degree of dispersion is checked with the naked eye and used.

Next, pH of the mixed solution is adjusted to a range of 10 to 12. The pH adjustment serves to control the reduction yield and loading amount of the transition metal for the core. The metal conversion yield of the precursor may be lowered or the loading amount may be lowered if pH is less than 10, and problems such as an excessive amount of reagents used in the manufacturing process, an increase in waste, and so on may occur if it exceeds 12. Particles having the transition metal introduced on the carbon support are manufactured by the pH adjustment.

Next, a solution containing particles having a transition metal core and a single-layered metal shell formed thereon is prepared by adding a metal precursor for a shell to the solution in which the purges have been performed. At this time, the metal precursor for the shell is reduced at the same time while the carbon monoxide adsorbed on the transition metal is being oxidized.

Although the metal precursor for the shell is generally used in the art and is not particularly limited, specifically, a precursor of one or more metals from the group consisting of platinum (Pt), gold (Au), palladium (Pd), iridium (Ir), ruthenium (Ru), osmium (Os), silver (Ag), and rhenium (Re) may be used. Such a precursor may include, for example, chlorides of metals, ammonium, various types of salts, etc. At this time, the metal precursor for the shell requires metal atoms of a stoichiometric ratio (1:1) in proportion to the specific surface area of the core metal. At this time, the amount of the metal precursor for the shell may be adjusted in order to form a multi-layered shell. Further, since the formation amount of the shell layer is determined depending on the amount of CO adsorption in the present disclosure, it may be easily controlled even in an environment in which an excessive amount of the metal precursor for the shell is present.

Additionally, the method may include the step of filtering, washing, and drying the solution containing the particles having the transition metal core and the single-layered metal shell formed thereon. At this time, washing may be performed using $C_1$-$C_6$ alcohol and ultrapure water, and drying may be performed at 50 to 120° C. for 6 to 24 hours.

Meanwhile, the present disclosure has another feature in a method for manufacturing particles having a transition metal core and a two-layered (2 atomic monolayer) metal shell formed thereon. Specifically, the method includes the steps of sequentially performing a primary nitrogen purge, a carbon monoxide purge, and a secondary nitrogen purge of the particles (the particles having the transition metal core and the two-layered metal shell formed thereon) in a solution containing the particles having the transition metal core and the single-layered metal shell formed thereon manufactured by the aforementioned method, and preparing a solution containing the particles having the transition metal core and the two-layered metal shell formed thereon by adding the metal precursor for the shell to the solution in which the purges have been performed.

Further, the present disclosure has another feature in a method for manufacturing particles having a transition metal core and a multi-layered metal shell formed thereon. Specifically, a solution containing particles having a transition metal core and a multi-layered metal shell formed thereon may be prepared by repeatedly performing a process consisting of the steps of sequentially performing a primary nitrogen purge, a carbon monoxide purge, and a secondary nitrogen purge of the particles (the particles having the transition metal core and the multi-layered metal shell formed thereon) in a solution containing particles having a transition metal core and a metal shell formed thereon manufactured by the aforementioned method, and adding a metal precursor for a shell to the solution in which the purges have been performed. As described above, the shell layer forms a multi-layered structure so that thickness adjustment of the shell may be easily controlled.

The particles having the transition metal core and the metal shell formed thereon manufactured by the above method may have a size of 1 to 100 nm along the orthogonal direction.

Hereinafter, preferred examples are presented to help understanding of the present disclosure, but the following examples are merely illustrative of the present disclosure, it will be apparent to those skilled in the art that various changes and modifications are possible within the scope of the present disclosure and the scope of the technical idea, and it goes without saying that such alterations and modifications fall within the scope of the appended claims.

Single-Layered Shell Structure

Example 1

A solution having the carbon particles dispersed therein was prepared by mixing 3.5 g of carbon particles (particle size of 20 to 100 nm, specific surface area of 100 to 400 m$^2$/g) with 1.5 L of ultrapure water, thereby dispersing the carbon particles in ultrapure water. At this time, the dispersion was performed in order of a batch-type ultrasonic disperser (rpm 4, 60 min, intensity max), a horn-type ultrasonic disperser (rpm max, 30 min, amp 25%), and a batch-type ultrasonic disperser (rpm 4, 30 min, intensity max).

After adding 15 ml of a $PdCl_2$ solution (10% Pd solution) to the solution having the carbon particles dispersed therein, the $PdCl_2$ solution was stirred in the solution having the carbon particles dispersed therein for 30 minutes to obtain a mixed solution.

Thereafter, pH of the mixed solution was adjusted to 11 using 1.0 M NaOH. A solution containing Pd/C particles having carbon monoxide adsorbed thereon was prepared by performing a nitrogen ($N_2$) purge for 20 minutes and performing a carbon monoxide purge (CO-1000 mL/min purge) for 30 minutes in the solution of which pH had been adjusted to 11.

Thereafter, after performing a nitrogen ($N_2$) purge for 60 minutes in the solution containing the Pd/C particles, and adding $K_2PtCl_4$ to the solution containing the Pd/C particles, $K_2PtCl_4$ was stirred in the solution containing the Pd/C particles for 2 hours. The $K_2PtCl_4$ was appropriately adjusted to maintain a stoichiometric ratio of Pd to Pt of 1:1 or more.

Thereafter, after washing the stirred solution using a filter, ethanol, and ultrapure water, the washed solution was dried for 24 hours to manufacture particles (Pd@Pt/C) having a 30 wt % palladium core and a platinum shell formed thereon on carbon.

Example 2

Pd@Pt_2ML/C in which Pt was coated with two atomic layers was manufactured by using Pd@Pt/C manufactured in Example 1 above as a reactant, and repeating the same process as in Example 1.

Figure 2:
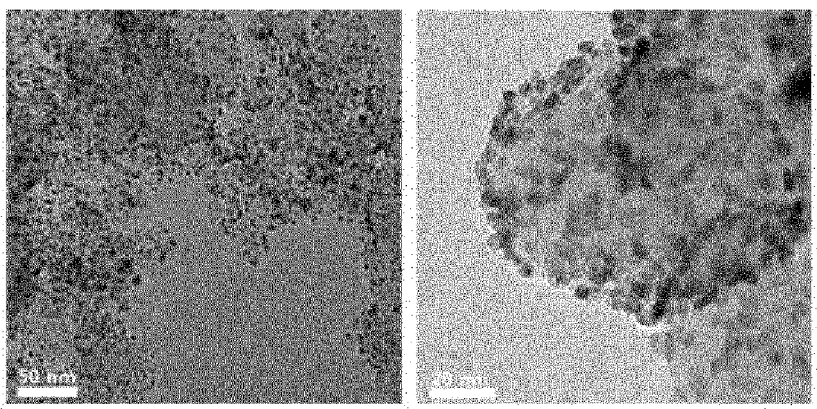
FIG. 2 is TEM photographs of core-shell particles manufactured in Example 1 according to the present disclosure.

FIG. 2 is TEM photographs of core-shell particles manufactured in Example 1 according to the present disclosure, and it can be confirmed that the metals are well distributed on the carbon particles.

Figure 3A:
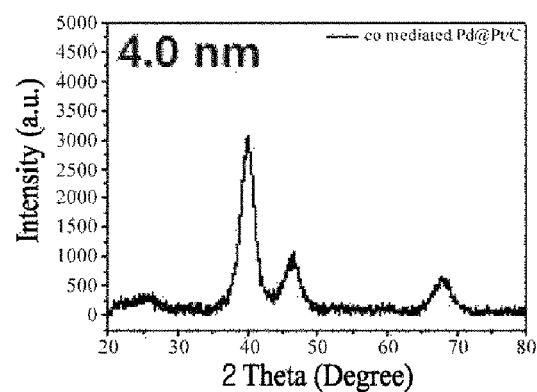
FIG. 3A is an XRD graph of the core-shell particles manufactured in Example 1 according to the present disclosure.
Figure 3B:
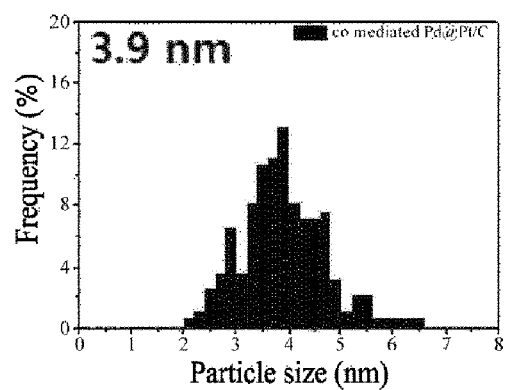
FIG. 3B is an active metal particle size distribution graph thereof.

FIG. 3A is an XRD graph of the core-shell particles manufactured in Example 1 according to the present disclosure and FIG. 3B is an active metal particle size distribution graph thereof, and it can be confirmed that the size of the particles is a level of about 4.0 nm.

Figure 4A:
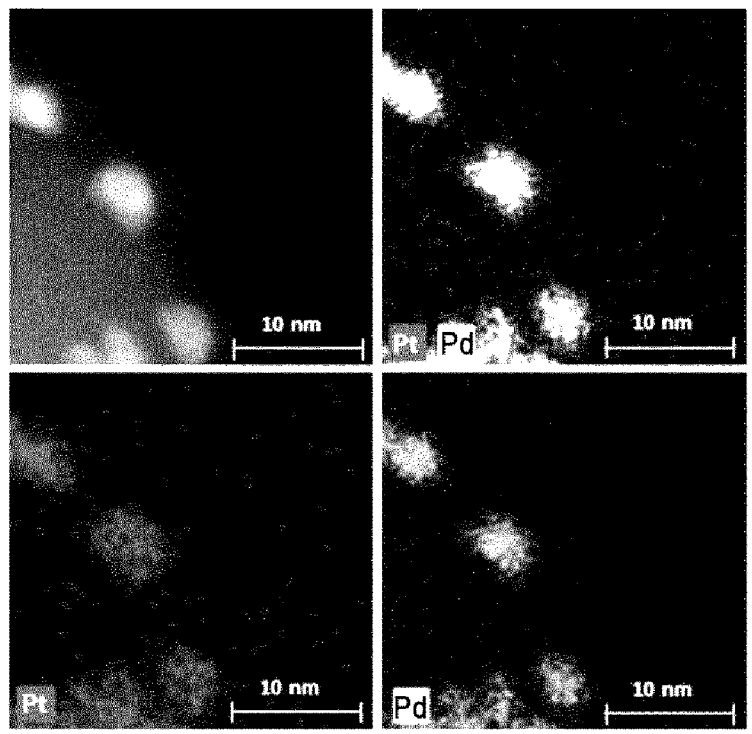
FIG. 4A is STEM photographs of the core-shell particles manufactured in Example 1 according to the present disclosure and FIG. 4B is results of analyzing scanning transmission electron microscopy-energy dispersive spectroscopy (STEM-EDS) and a core-shell structure of the core-shell particles manufactured in Example 1 according to the present disclosure.
Figure 4B:
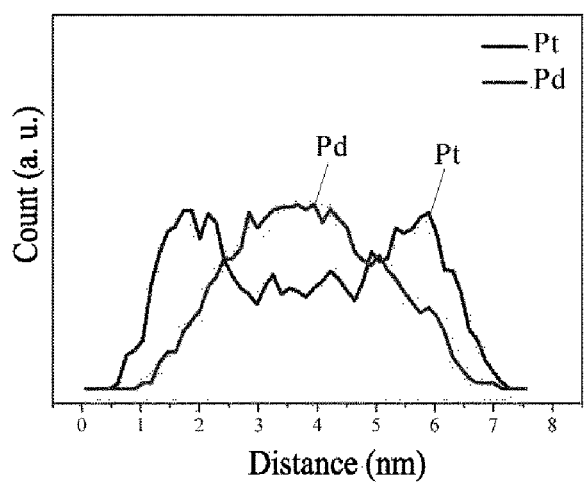

FIG. 4 is STEM-EDS analysis results of the core-shell particles manufactured in Example 1 according to the present disclosure, and it can be confirmed that a Pt monolayer is formed on Pd.

Figure 5A:
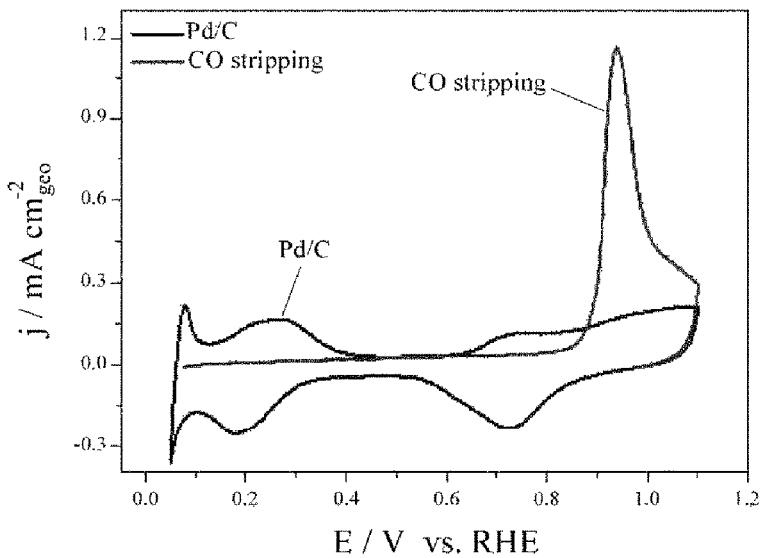
FIG. 5A is a graph of the voltammogram, showing a CO stripping peak on Pd.
Figure 5B:
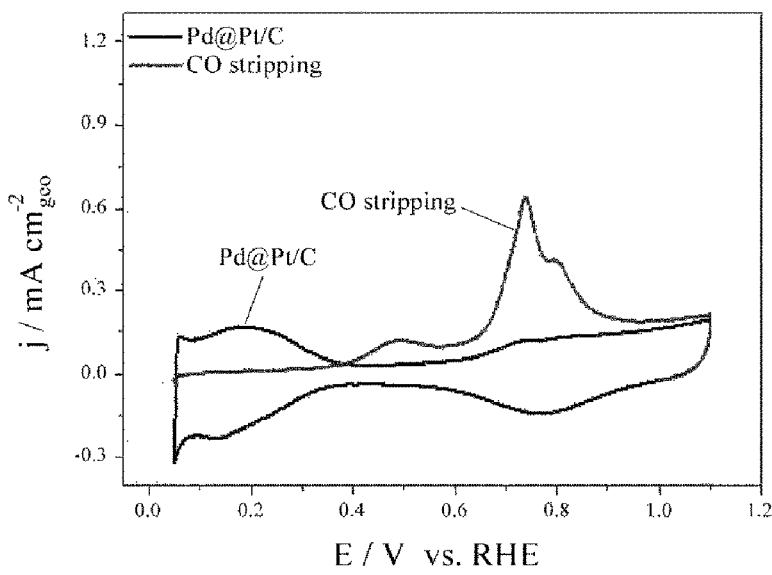
FIG. 5B is a result of CO stripping for the core-shell particles having Pt coated on the surface of Pd, and it can be confirmed that CO is desorbed in a lower potential region.

FIG. 5 is graphs of the voltammogram for the core-shell particles manufactured in Example 1 according to the present disclosure, FIG. 5A is a CO stripping peak on Pd, FIG. 5B is a result of CO stripping for the core-shell particles having Pt coated on the surface of Pd, and it can be confirmed that CO is desorbed in a lower potential region. It can be confirmed through this that the Pt atomic layer may be additionally formed through the same process even when the Pt layer is already formed.

Comparative Example 1

Commercial catalyst of Pt/C (Johnson Matthey, HiSpec 4000 product)

Comparative Example 2

Core-shell particles Pd@Pt/C manufactured using the Cu-UPD method.

Experimental Example 1

A half-cell test was performed using particles (Pd@Pt/C_CO) having a palladium core and a platinum shell formed thereon manufactured in Example 1 above. The results of the half-cell test are shown in Table 1 below.

TABLE 1

| | |
|---|---|
| ECSA [electrochemical active surface area] ($m^2/g_{Pt}$) | 142.00 |
| ECSA [electrochemical active surface area] ($m^2/g_{PGM}$) | 77.21 |
| $MA_{1600\ rpm}$ [mass activity] (A/$mg_{Pt}$) | 0.67 |
| $MA_{1600\ rpm}$ [mass activity] (A/$mg_{PGM}$) | 0.37 |
| SA [specific activity] (uA/$cm^2$) | 475.68 |
| $E_{1/2}$ [half-wave potential] (mV) | 905 |

PGM; Platinum group metal

Further, Table 2 below shows the results of the half-cell test using the particles of Example 2, Comparative Example 1, and Comparative Example 2 according to the present disclosure.

TABLE 2

| | Example 1 | Comparative Example 1 | Comparative Example 2 |
|---|---|---|---|
| ECSA [electrochemical active surface area] ($m^2/g_{Pt}$) | 142.0 | 55.9 | 87.4 |
| $MA_{1600\ rpm}$ [mass activity] (A/$mg_{Pt}$) | 0.67 | 0.22 | 0.47 |

As shown in Table 2, Example 1 according to the present disclosure shows ECSA and mass activity that are about 3 times higher levels than Comparative Example 1, and it can be confirmed that ECSA and mass activity are increased by about 1.5 times or more in Example 1 according to the present disclosure compared to Comparative Example 2.

Experimental Example 2

A single-cell test was performed using the particles (Pd@Pt/C_CO) having a palladium core and a platinum shell formed thereon manufactured in Example 1 above. At this time, conditions are as follows, and results of the single-cell test are shown in Table 3 below.

Air electrode (Cathode): Pd@Pt/C, Aquivion® D83 (I/C=0.6), PGM loading (0.116 $mg_{PGM}/cm^2$) Pt loading (0.062 $mg_{Pt}/cm^2$)

Fuel electrode (Anode): TKK TEC10E50E ($^{50\%}$Pt/C), Aquivion® D83 (I/C=0.8), Pt loading (0.12 $mg_{Pt}/cm^2$)

Active area (25 $cm^2$), proton exchange membrane (PEM, NRE-211 (25 μm)), relative humidity (RH) 100%

TABLE 3

| | |
|---|---|
| ECSA [electrochemical active surface area] ($m^2/g_{Pt}$) | 136.8 |
| ECSA [electrochemical active surface area] ($m^2/g_{PGM}$) | 73.1 |
| Current density at 0.6 V (mA $cm^{-2}$) | 896.0 |
| $HER_{average}$ [High Frequency Resistance] (mΩ * $cm^2$) | 49.0 |
| OCV [Open circuit voltages] (mV) | 935.3 |

PGM; platinum group metal

Multi-Layered Shell Structure

Example 3

(A) Particles (Pd@Pt_1ML/C) with a single-layered (ML) shell structure having a palladium core and a platinum shell formed thereon manufactured by the method of Example 1 above.

(B) Pd@Pt/C manufactured in (A) was used as a reactant, and the same purge process as in (A) was repeatedly performed (nitrogen purge, carbon monoxide purge, and nitrogen purge). Thereafter, after secondly adding $K_2PtCl_4$ to the purged solution, the secondly added $K_2PtCl_4$ was stirred in the purged solution for 2 hours. The second $K_2PtCl_4$ was appropriately adjusted to maintain a stoichiometric ratio of Pd to Pt of 1:1 or more.

Thereafter, after washing the stirred solution using a filter, ethanol, and ultrapure water, the washed solution was dried for 24 hours to manufacture particles (Pd@Pt_2ML/C) with a two-layered (2ML) shell structure having a palladium core and a platinum shell formed thereon on carbon.

(C) Pd@Pt_2ML/C manufactured in (B) was used as a reactant, and the same purge process as in (A) was repeatedly performed (nitrogen purge, carbon monoxide purge, and nitrogen purge). Thereafter, after secondly adding $K_2PtCl_4$ to the purged solution, the secondly added $K_2PtCl_4$ was stirred in the purged solution for 2 hours. The second $K_2PtCl_4$ was appropriately adjusted to maintain a stoichiometric ratio of Pd to Pt of 1:1 or more.

Thereafter, after washing the stirred solution using a filter, ethanol, and ultrapure water, the washed solution was dried for 24 hours to manufacture particles (Pd@Pt_3ML/C) with a three-layered (2ML) shell structure having a palladium core and a platinum shell formed thereon on carbon.

The metal content ratios of the core-shell particles of each of (A), (B), and (C) are shown in Table 4 below.

TABLE 4

| Classification | Pd (wt %) | Pt (wt %) |
|---|---|---|
| Particles with 1 ML structure | 23.3 | 22.1 |
| Particles with 2 ML structure | 17.2 | 42.6 |
| Particles with 3 ML structure | 12.2 | 59.2 |

Figure 7:
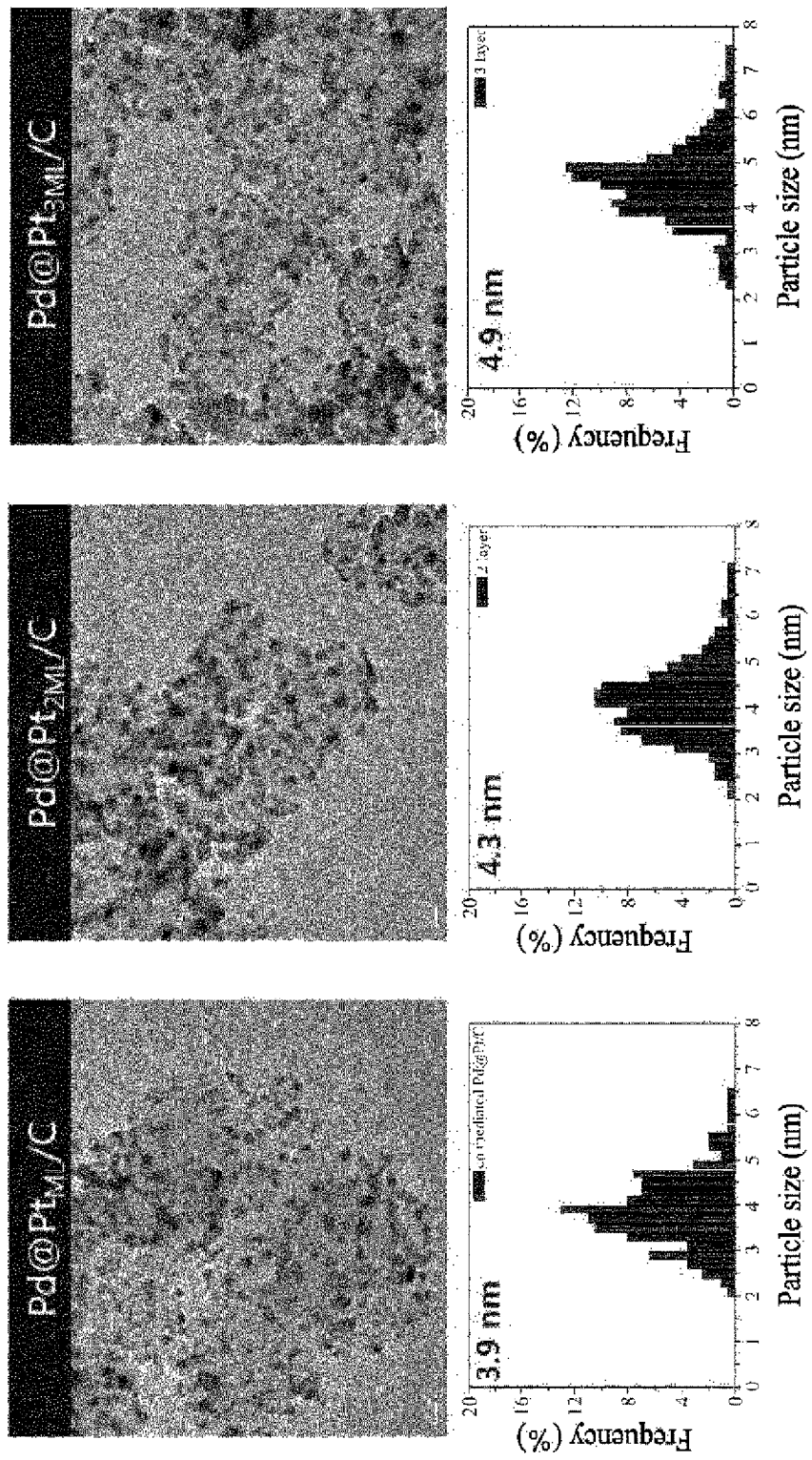
FIG. 7 is inductively coupled plasma-mass spectrometry (ICP-MS) photographs and TEM photographs of core-shell particles manufactured in Example 3 according to the present disclosure.

FIG. 7 is ICP-MS photographs and TEM photographs of the core-shell particles manufactured in Example 3 according to the present disclosure, and it can be confirmed that the metals are well distributed on the carbon particles, and the size of the particles formed in each layer is 3.9 nm for ML, 4.3 nm for 2ML, and 4.9 nm for 3ML.

Figure 8:
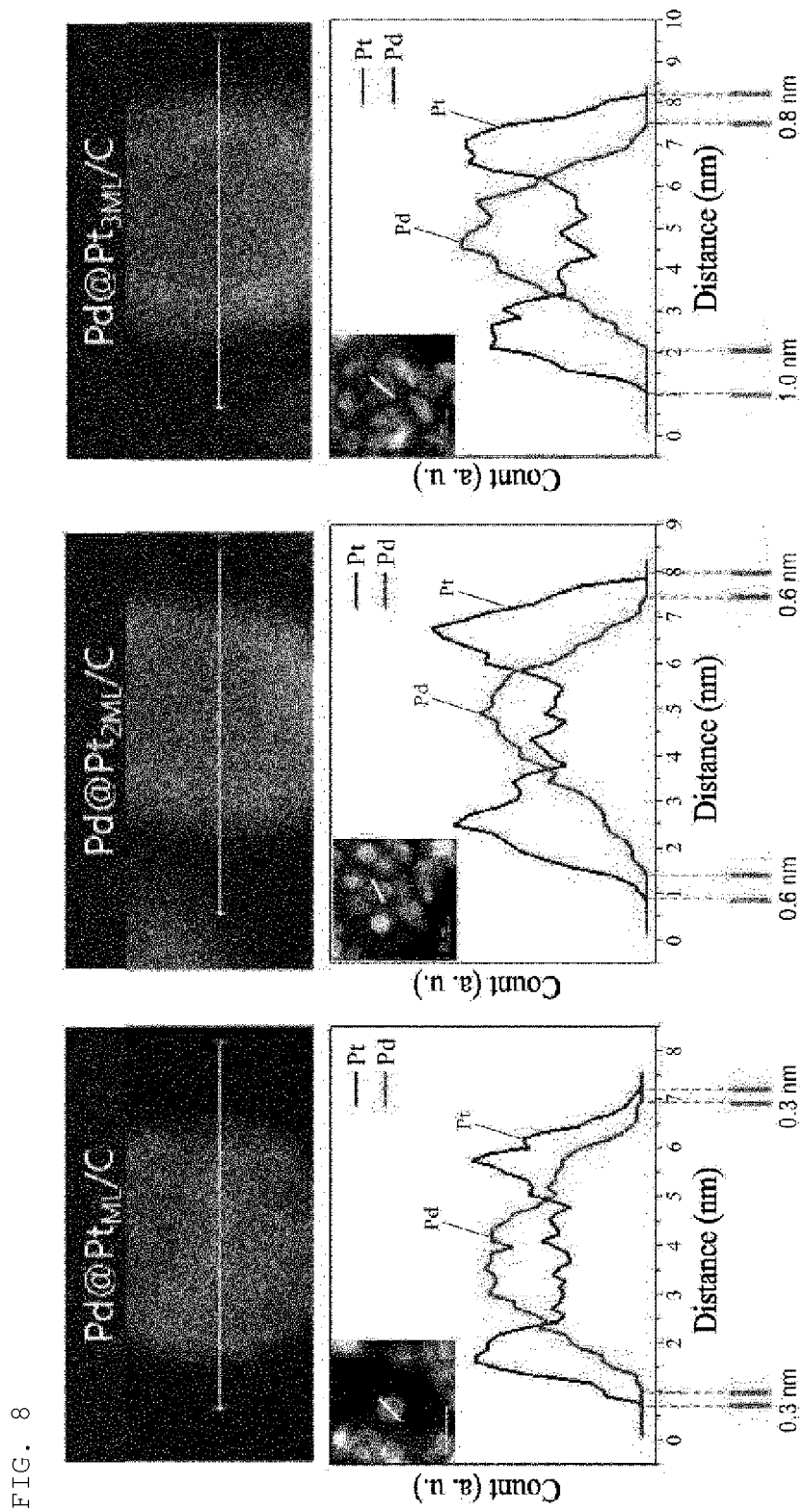
FIG. 8 is results of analyzing structures of the core-shell particles manufactured in Example 3 according to the present disclosure.

FIG. 8 is results of analyzing structures of the core-shell particles manufactured in Example 3 according to the present disclosure, and it can be confirmed that the thickness of the Pt layer on the surface increases by about 0.3 nm as the formation number of Pt atomic layers is increased. This shows that the present disclosure may smoothly control the coating thickness of the outer Pt layer.

Experimental Example 3

A half-cell test was performed using particles (Pd@Pt/C_CO) having a palladium core and a platinum shell of each layer structure formed thereon manufactured in Example 3 above. The results of the half-cell test are shown in Table 5 below.

TABLE 5

| | Classification | Particles with ML structure | Particles with 2 ML structure | Particles with 3 ML structure |
|---|---|---|---|---|
| Pt | ESCA (m²/g) | 88.98 | 43.81 | 27.26 |
| | MA 1600 rpm (A/mg) | 1.06 | 0.46 | 0.26 |
| PGM | ESCA (m²/g) | 43.27 | 31.21 | 22.60 |
| | MA 1600 rpm (A/mg) | 0.51 | 0.33 | 0.21 |
| | SA (uA/cm) | 831.42 | 809.43 | 731.80 |
| | $E_{1/2}$ (mV) | 912 | 917 | 920 |

Different Types of Core Metals

Example 4

Particles (Ir@Pt/C) having a 17.7 wt % iridium core and a platinum shell formed thereon were manufactured in the same manner as in Example 1 above except that an iridium (Ir) precursor instead of a $PdCl_2$ solution was used.

Example 5

Particles (Ru@Pt/C) having a 17.2 wt % ruthenium core and a platinum shell formed thereon were manufactured in the same manner as in Example 1 above except that a ruthenium (Ru) precursor instead of a $PdCl_2$ solution was used.

Experimental Example 4

A half-cell test was performed using the particles having a core and a shell formed thereon manufactured in Examples 4 and 5 above. The results of the half-cell test are shown in Table 6 below.

TABLE 6

| Classification | ESCA (m²/g) | MA (A/mg) rpm->∞ | $E_{1/2}$ (mV) |
|---|---|---|---|
| Example 4 | 80.27 | 0.192 | 824 |
| Example 5 | 133.89 | 0.143 | 840 |

Figure 9:
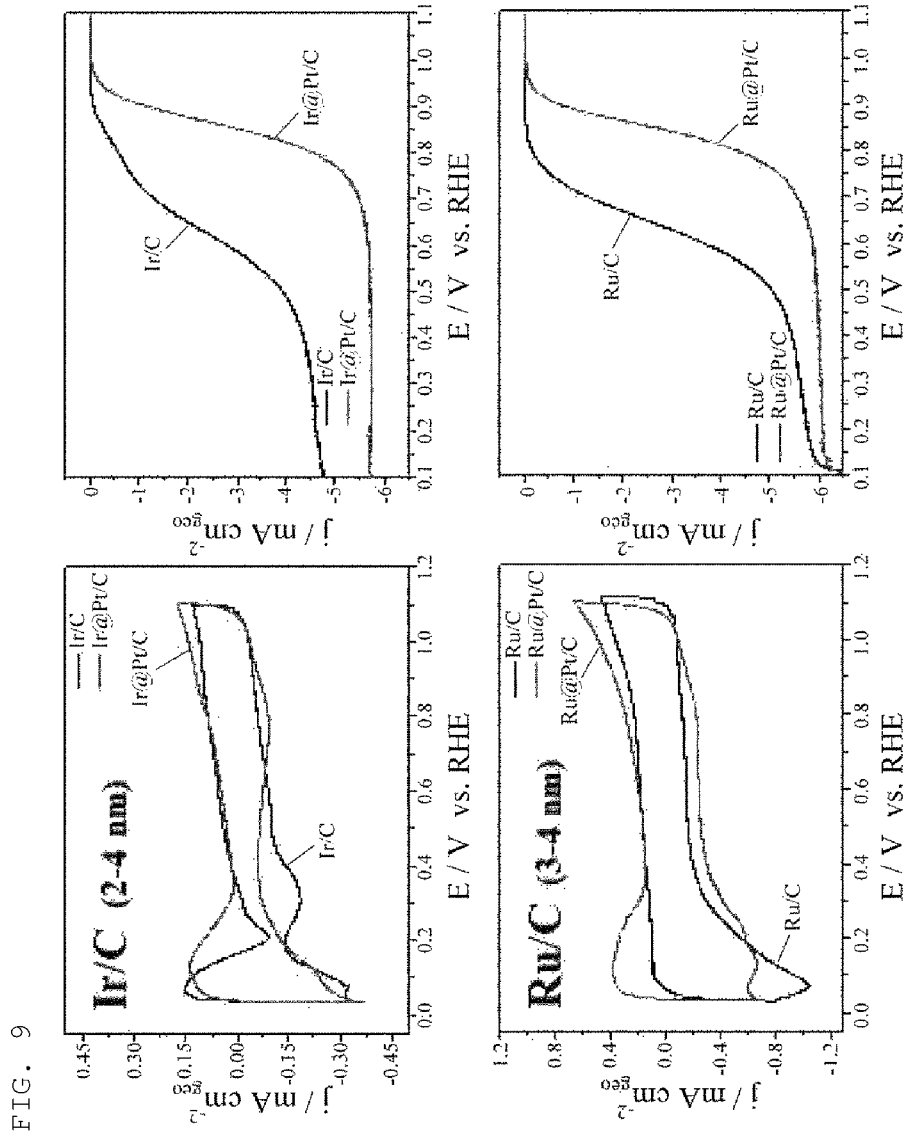
FIG. 9 is electrochemical evaluation results showing comparisons of electrochemical properties and mass activities of core-shell particles manufactured in Examples 4 and 5 according to the present disclosure.

FIG. 9 below is graphs of the voltammogram showing comparisons of electrochemical properties and mass activities of the core-shell particles manufactured in Examples 4 and 5 according to the present disclosure. According to FIG. 9, it can be confirmed that, when the material present in the core changes, the mass activity based on Pt is also affected, and both Ir and Ru have relatively low reaction activities compared to Pd in the oxygen reduction reaction.

Figure 10:
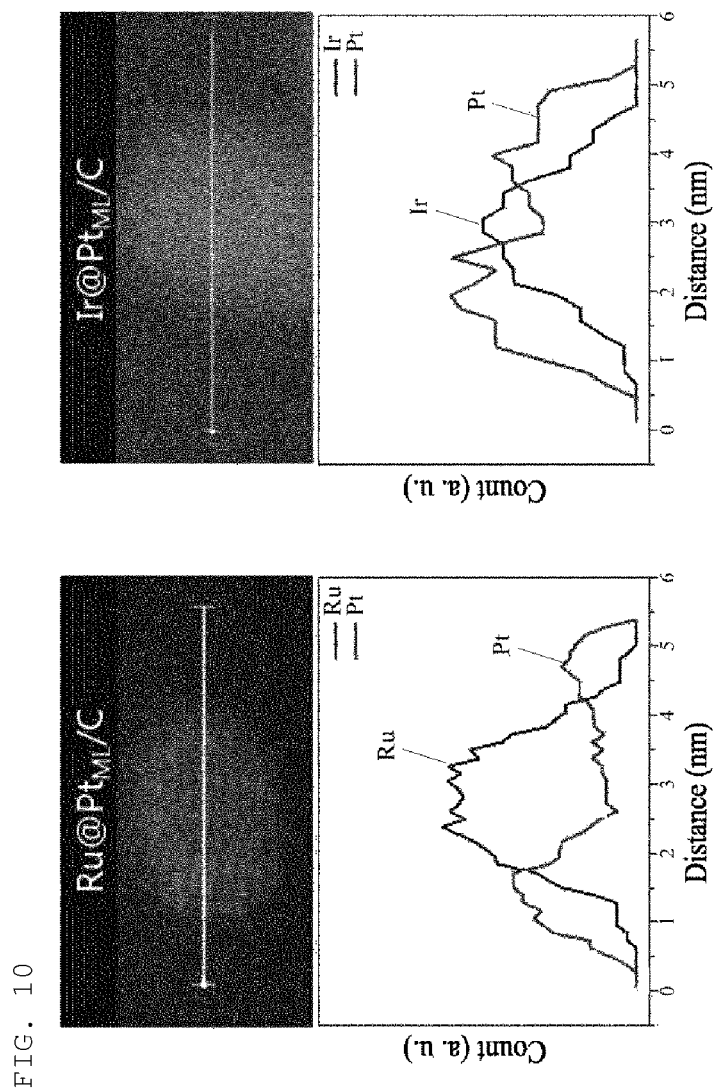
FIG. 10 is analysis photographs showing that active metal particles manufactured in Examples 4 and 5 according to the present disclosure well form core-shell structures.

Further, it can be confirmed in FIG. 10 that the manufactured catalyst has a core-shell form having a platinum layer stacked on the outer portion thereof even in the case of the core-shell particles manufactured in Examples 4 and 5 according to the present disclosure.

The above description is merely exemplary description of the technical idea of the present disclosure, and various modifications and alterations are possible within a range that does not depart from the essential characteristics of the present disclosure by those with ordinary skill in the art to which the present disclosure pertains. The protective scope of the present disclosure should be interpreted by the scope of claims below, and all technical ideas within the scope equivalent thereto should be construed as being included in the scope of rights of the present disclosure.

What is claimed is:

1. A method for manufacturing core-shell particles using carbon monoxide, the method comprising steps of:
    adsorbing the carbon monoxide on a transition metal for a core; and
    reacting the carbon monoxide adsorbed on the surface of the transition metal for the core, a metal precursor for a shell, and a solvent, and forming particles of a core-shell structure having a reduced metal shell layer formed on a transition metal core;
        wherein the transition metal for the core is selected from the group consisting of palladium (Pd), iridium (Ir), and ruthenium (Ru),
    the metal precursor for the shell is a divalent platinum precursor, and
    the reduced metal shell layer formed on the transition metal core is Pt single-layer.

2. The method of claim 1, wherein the solvent is ultrapure water or $C_1$-$C_6$ alcohol.

3. The method of claim 1, wherein the step of adsorbing carbon monoxide on the transition metal for the core includes sequentially performing a primary nitrogen purge, a carbon monoxide purge, and a secondary nitrogen purge on a transition metal solution for the core.

4. The method of claim 3, wherein the step of forming particles of the core-shell structure includes adjusting the pH of the transition metal solution for the core to 10 to 12.

5. The method of claim 1, wherein the step of forming particles of the core-shell structure is repeatedly performed to form a multi-layer metal shell.

\* \* \* \* \*